Figure 1:
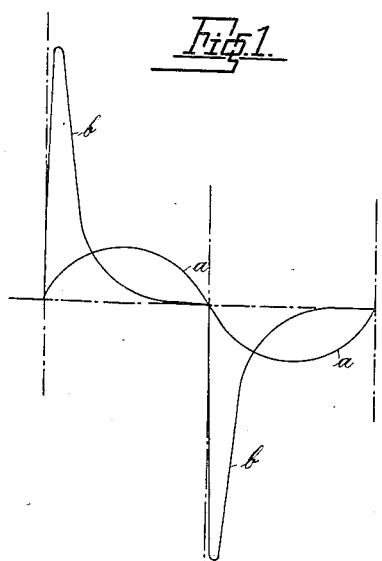

E. PRESSER.
PROCESS FOR THE CLOSING OF THE SEAMS OF TUBES BY MEANS OF ELECTRICAL RESISTANCE WELDING.
APPLICATION FILED MAY 2, 1911.

1,031,026. Patented July 2, 1912.

Attest
P. McDermott
O. W. Smith

Inventor
Ernst Presser
By his atty

UNITED STATES PATENT OFFICE.

ERNST PRESSER, OF BERLIN, GERMANY, ASSIGNOR TO GESELLSCHAFT FÜR ELEKTROTECHNISCHE INDUSTRIE, MIT BESCHRÄNKTER HAFTUNG, OF BERLIN, GERMANY.

PROCESS FOR THE CLOSING OF THE SEAMS OF TUBES BY MEANS OF ELECTRICAL RESISTANCE WELDING.

1,031,026.      Specification of Letters Patent.      Patented July 2, 1912.

Application filed May 2, 1911. Serial No. 624,617.

*To all whom it may concern:*

Be it known that I, ERNST PRESSER, a subject of the Grand Duke of Oldenburg, residing at Berlin, Kingdom of Prussia, Empire of Germany, have invented new and useful Improvements in Processes for the Closing of the Seams of Tubes by Means of Electrical Resistance Welding, of which the following is a specification.

Proposals have been made to close the longitudinal seams of tubes formed from a bent strip of sheet metal, by means of the process of electrical resistance welding, but it has been found, that by such process a uniform closing of the whole seam of the tube cannot be secured, because the conditions are not uniform on the whole length of the seam, but are subjected to very considerable variations. In consequence of the varying thickness of the layer of oxid on the abutting narrow tube edges, dirt which has entered the interstices or bur adhering to the edges, the electrical resistance is very different at various points of the seam, so that when using the usual simple alternating current the strength of current varies correspondingly at the several parts, in other words the tube is correctly welded at some parts and at other parts it is not welded at all. Further disadvantages of the usual process of welding, when applied to tubes, are that a great portion of the current, which was passed through the electrodes to the wall of the tube adjacent to the part to be welded, does not pass between the lapping or abutting edges, but instead passes around the tube and hence this part of the current was completely lost from the welding operation. This was due to the fact that the potential of the welding current, being small, the tendency was to pass around the body of the pipe against the ohmic resistance rather than pass directly across the abutted or lapped edges of the tube skelp. This is also the reason, why electrically welded tubes have not come on the market hitherto, although the protective rights therefor are comparatively old.

By the present invention the first mentioned disadvantage of uneven welding is entirely avoided, and the defect mentioned secondly is considerably reduced. This invention consists in feeding the welding parts, respectively the primary winding of the welding transformer from a source of direct current in combination with condensers, the condenser being continually charged and discharged by means of suitable switch devices. In this process the quantity of heat produced in the welding place per second is in a high degree independent of the condition of the part to be welded, because the electric energy changed per second is only dependent on the number of periods of alternating current generated secondarily, which is adjustable by the current changer, and on the size of the condensers. Therefore, if at a part of the tube to be welded a greater electrical resistance is present, than at another part, nevertheless an equal quantity of heat is produced per second. The difference is only that at the part when the greater electrical resistance prevails the current curve is less high, this however is equalized by the greater length of the curve of current. Thus this invention renders it possible to feed a tube of any desired length past the welding electrodes at a certain uniform speed, without any danger of the weld or seam becoming hotter at one part than at another, if only care is taken, which can be easily done, that the current changer works at a constant speed. Thereby only does it become possible to weld tubes in a mechanical way, almost automatically, by means of an electric current.

Figure 2:
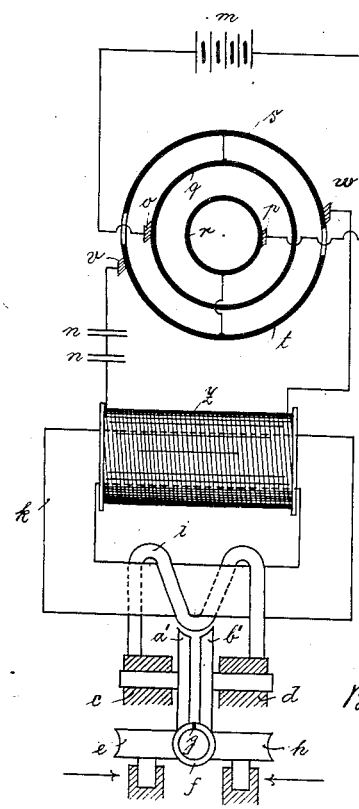

The reduction of the secondly mentioned defect which applies to welding processes which have become known hitherto is explained hereinafter by reference to the accompanying drawing, in which:

Figure 1 is a diagram illustrating induced currents, such as used in electrical welding by the previous method and present invention respectively; and Fig. 2 diagrammatically illustrates my improved apparatus for electrically welding pipe seams by my improved method.

In Fig. 1 *a* is a sinuous alternating current curve which corresponds to the current curve of the usual induced alternating current heretofore used, and *b* illustrates the current curve of the induced or secondary current which is obtained by means of the process of my invention. It will be seen that the latter curve with an equal electrical effect has a much more pointed form, therefore that a rate of change of the current strength is much greater in the case of this current than in the case of the ordinary alternating current. However, as a part of the current, which at the welding of tubes passes around the tube instead of through the parts to be welded, is dependent not only on the ohmic resistance of the tube wall, but also very largely on the inductive resistance of the same, and as on the other hand the inductive resistance is directly proportional to the rate of change of the current strength, it is clear, that by the use of the present process the current passing uselessly parallel to the welding place can be considerably reduced.

Referring to Fig. 2, $a'$ and $b'$ are two roll electrodes revolubly mounted in the brackets $c$ and $d$. $f$ is a metallic tube, the seam $g$ of which is to be welded throughout its length. For this purpose the tube is moved with suitable velocity under electrode rolls $a'$ and $b'$ which are connected with the secondary winding of the welding transformer $k$. The pressing rolls $e$ and $h$, which are adjusted toward each other by any mechanical means in the direction indicated by the arrows, are provided for the purpose of producing on the edge to be welded the pressure necessary during the welding process. The electric energy required for the welding process is given, for instance, by the battery or source of energy $m$ which is connected with the brushes $o$ and $p$ resting on the contact rings $q$ and $r$. These rings are connected with the contact segments $s$ and $t$, with which the brushes $v$ and $w$ make contact. The latter are connected with the first winding $z$ of the transformer $k$, the condensers $n$ $n$ being interposed in the circuit. The sliding rings $q$ and $r$ and the contact segments $s$ and $t$ are rotated in any suitable manner, for instance, by a little electromotor. Therefore the condensers $n$, $n$, are charged from the brushes $o$, $p$, and $v$, $w$, alternately in opposite directions, the current impulses acting to reverse or alternate the charge passing through the primary winding $z$ of the welding transformer. Therefore, the alternating current which is thus provided in the primary winding is transformed so that a large secondary current of reasonably low tension is provided in the secondary winding $i$ adapted for the welding under my invention.

The application of the present process therefore renders possible not only the mechanical production of a uniformly welded tube seam, but also a considerable saving in the cost of the current. Particularly in the manufacture of iron tubes, the saving of current attained is considerable, because the inductive resistance relatively to the ohmic resistance becomes more prominent in an iron tube wall than in the case of other metals.

I claim:

1. In electrical welding apparatus, the combination of a transformer having coarse and fine windings, a source of continuous current electric energy, circuits between the source of electric energy and the terminals of the fine windings of the transformer, a current reverser in the electric circuits for supplying current of alternating sign to the transformer, electric condenser devices arranged between the current reverser and the fine winding of the transformer, and electrodes for supplying electric energy to the article to be welded, said electrodes being respectively in electrical connection with the terminals of the coarse winding of the transformer.

2. In electrical welding apparatus, the combination of a transformer having coarse and fine windings, a source of continuous current electric energy, circuits between the source of electric energy and the terminals of the fine windings of the transformer, a current reverser in the electric circuits for supplying current of alternating sign to the transformer, electric condenser devices arranged between the current reverser and the fine winding of the transformer, and electrodes for supplying electric energy to the article to be welded, said electrodes consisting of rotatable parts against which the work is pressed and under which it may be fed, being respectively in electrical connection with the terminals of the coarse winding of the transformer.

3. The herein described method of electrical welding which consists in energizing the primary winding of a transformer from a source of continuous current, by rapidly reversing the said current and thereby producing current impulses of opposite sign, changing the characteristics of said current impulses by impressing upon them static discharges from a condenser and delivering the alternating current discharges so formed to the transformer, and supplying the induced current from the transformer to the work to be welded.

ERNST PRESSER.

Witnesses:
WOLDEMAR HAUPT,
HENRY HASPER.